Figure 1:
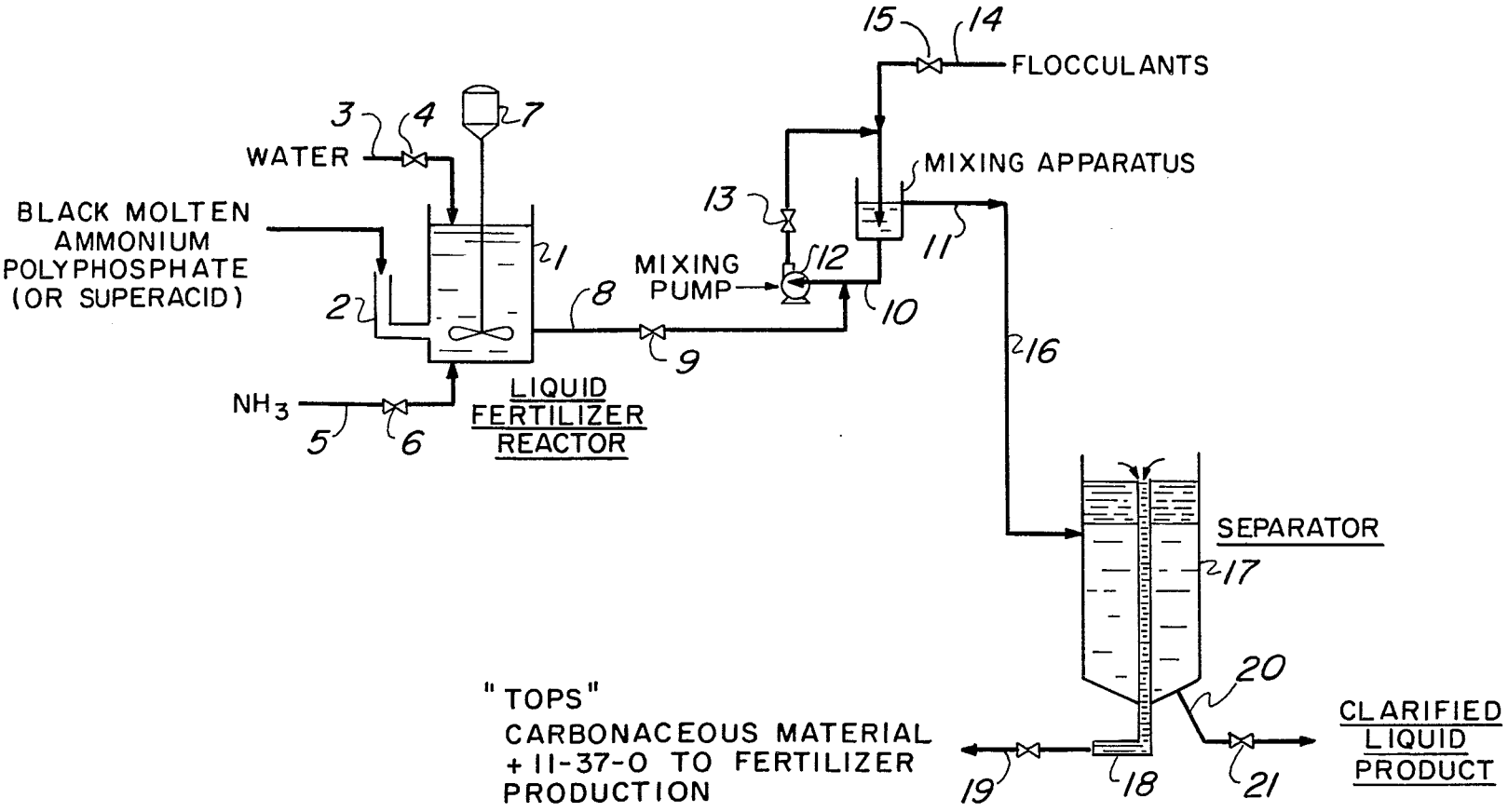
Figure 2:
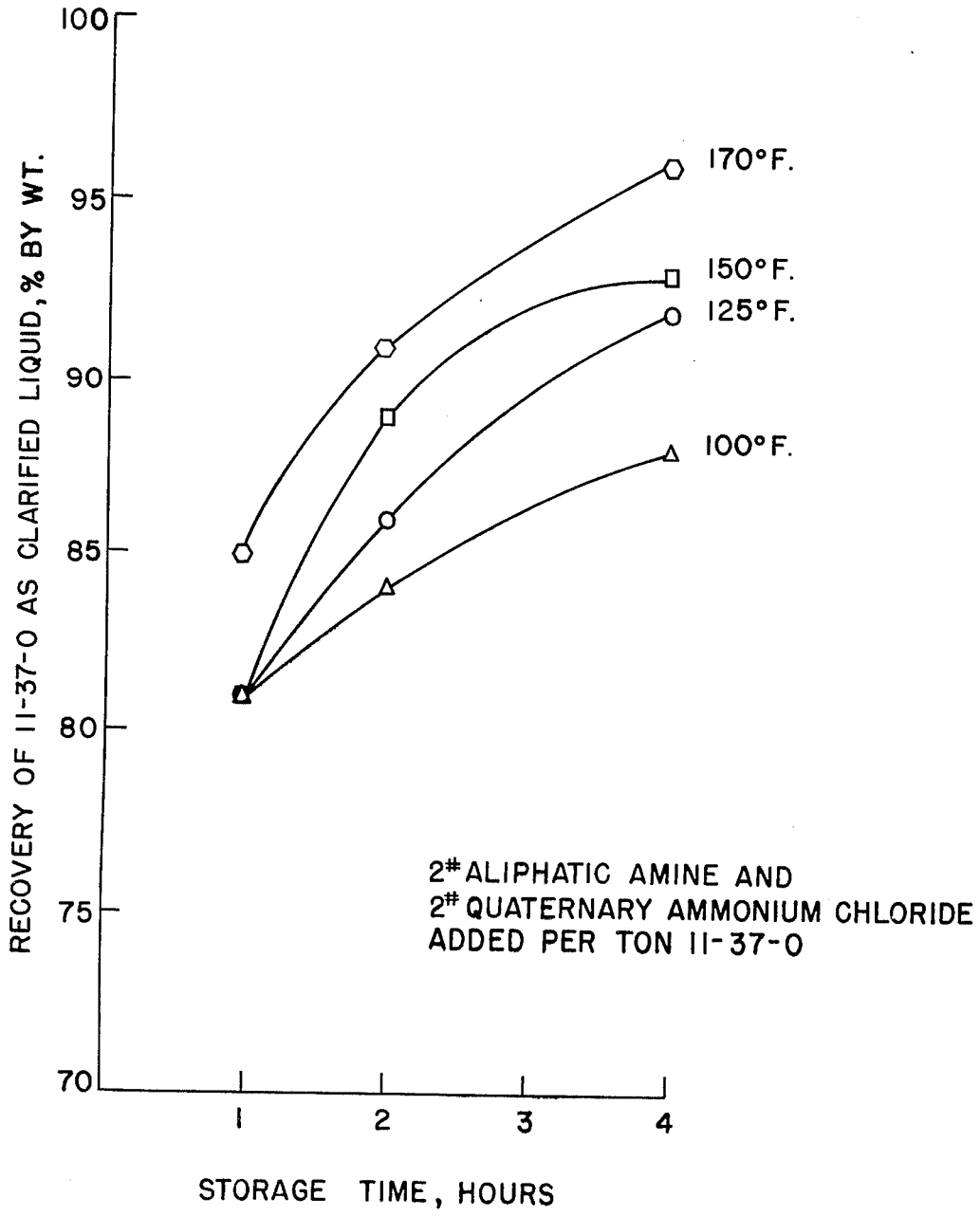
Figure 3:
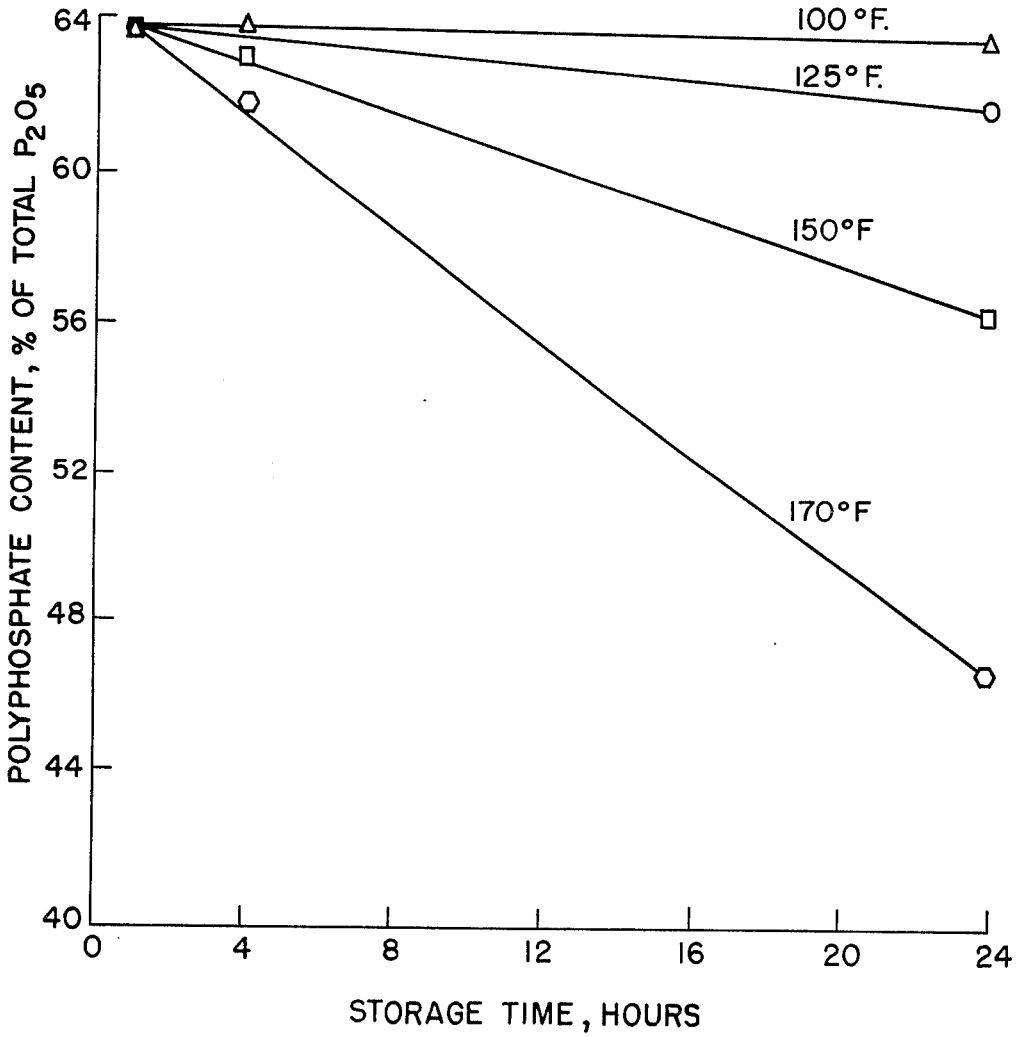
Figure 4:
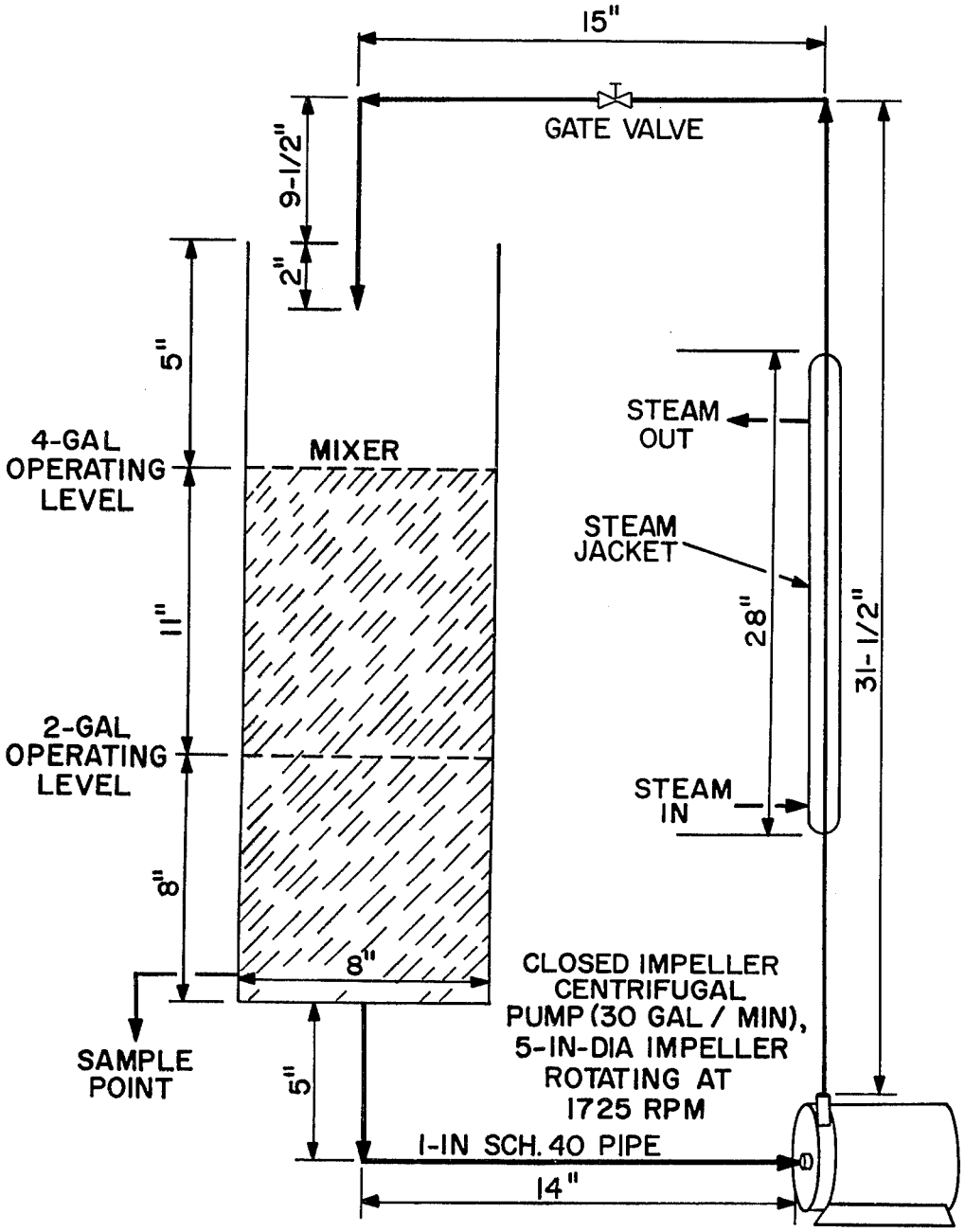
Figure 5:
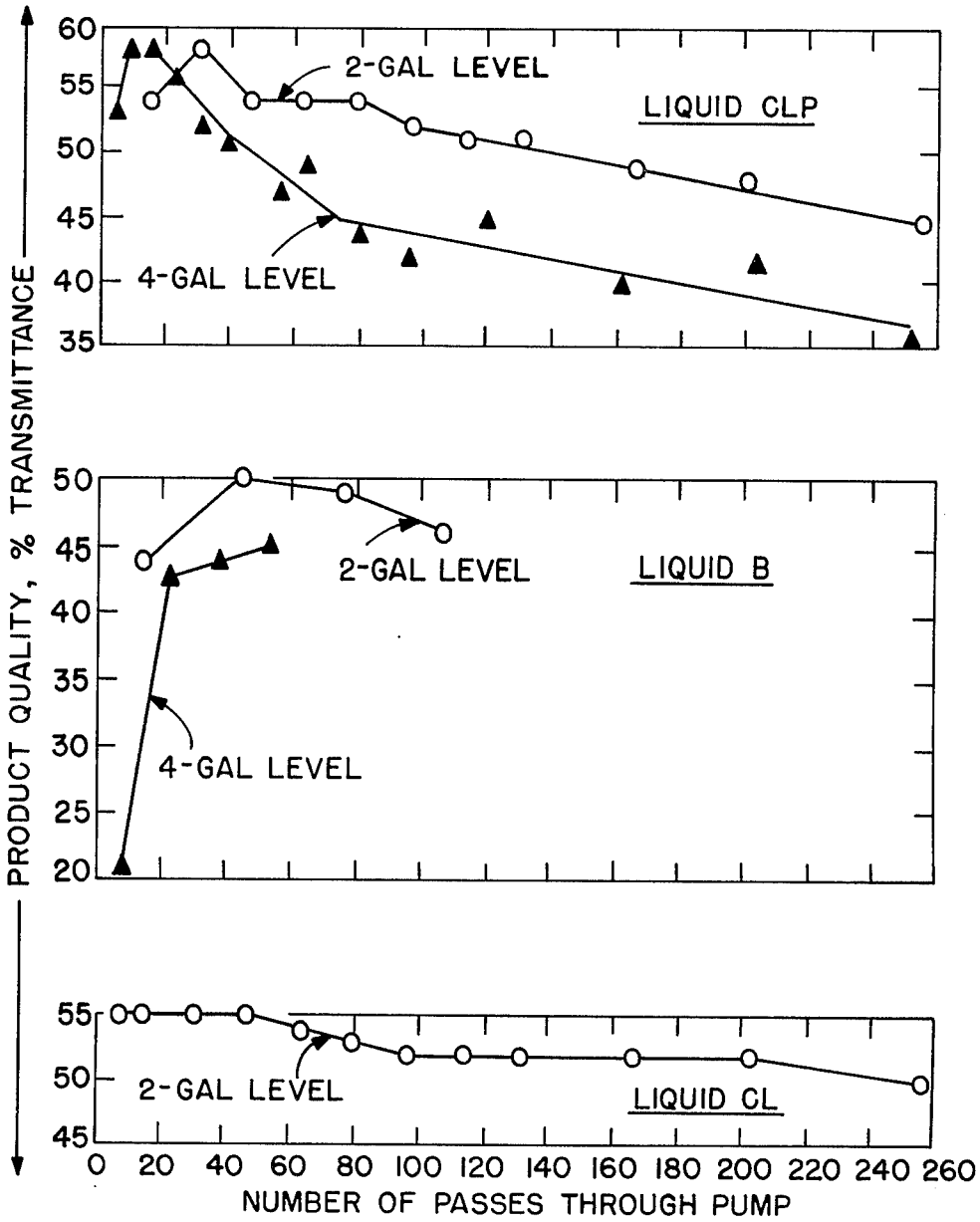

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED JANUARY 6, 1976

942 O.G. 190

T942,007

REMOVAL OF CARBONACEOUS MATTER FROM AMMONIUM POLYPHOSPHATE LIQUIDS

John M. Stinson, 1525 Ridge Drive, Sheffield, Ala. 35660; Horace C. Mann, Jr., 1942 Holiday Drive, Florence, Ala. 35630; and Dale H. Johnson, 223 S. Cornell Ave., Villa Park, Ill. 60181

Filed Nov. 7, 1974, Ser. No. 521,752

Int. Cl. C01b *15/16, 25/16, 25/26*

U.S. Cl. 423—305

8 Sheets Drawing. 28 Pages Specification

Particulate carbonaceous matter in ammonium polyphosphate liquid made from impure wet-process phosphoric acid produced from uncalcined phosphate rock is removed either batchwise or continuously by intimately mixing the liquid with a centrifugal pump or a high-shear mixed with a combination of selected water-insoluble organic flocculating agents consisting of a combination of primary amines and quaternary ammonium chlorides and then transferring the mixture to a separation vessel where the particulate carbonaceous matter rapidly floats to the surface. Black ammonium polyphosphate liquids ranging in grade from 8–27–0 to 11–37–0 and containing from about 50 to 90 percent polyphosphate were successfully clarified. From about 80 to 95 percent of the input black liquid was withdrawn from the bottom of the separation vessel as clarified liquid that contains essentially no particulate carbonaceous matter or flocculant. The particulate carbonaceous matter, essentially all of the flocculant, and the remainder of the input ammonium polyphosphate liquid are withdrawn from the top of the separation vessel and processed into fluid or solid fertilizers.

CLARIFICATION OF BLACK LIQUID FERTILIZER MADE FROM IMPURE PHOSPHORIC ACID

HYDROLYSIS OF BLACK 11-37-0

APPARATUS USED IN TESTS OF
BATCH MIXING FLOCCULANT WITH BLACK 11-37-0

BATCH MIXING OF FLOCCULANT WITH BLACK 11-37-0 IN PUMP-TANK MIXER--EFFECT OF NUMBER OF PASSES THROUGH PUMP ON 11-37-0 CLARITY

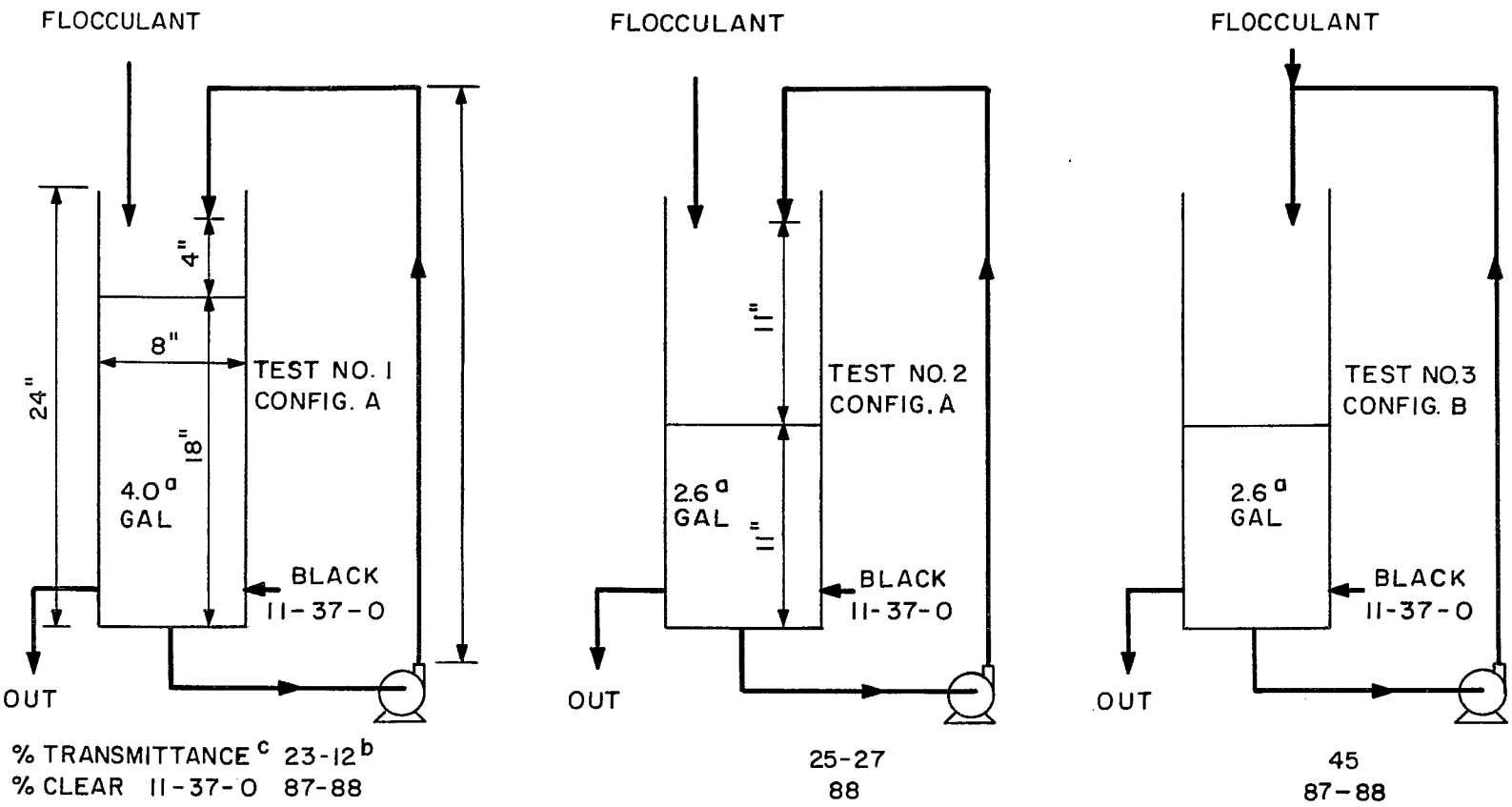

a VOLUME OF MIXER RESERVOIR AND RECIRCULATION LINE.
b THE CLARITY AND/OR RECOVERY OF THE LIQUID DID NOT REACH STEADY STATE AND DECREASED WITH TIME.
c % TRANSMITTANCE DETERMINED AT 560 NANOMETERS; DISTILLED WATER USED AS 100% TRANSMITTANCE STANDARD.
d BLACK 11-37-O (BATCH B-29 IN 4-GAL TEST; B-30 IN ALL OTHERS--SEE FOOTNOTE, TABLE I, FOR DESCRIPTION) FEED RATE, 600 LB/HR; 2 LB ARMEEN T + 2 LB ARQUAD 2HT-75 AT 140°F MIXED WITH 170°-180°F FOR 36 PASSES THROUGH THE 30-GAL/MIN MIXING PUMP. FLOCCULATED LIQUIDS EVALUATED BATCHWISE AFTER STORAGE FOR 1 HOUR AT 170°F.

Fig. 6

CONFIGURATIONS OF PILOT PLANT MIXER USED IN CONTINUOUS MIXING OF BLACK 11-37-O WITH FLOCCULANTS- EFFECTS ON PRODUCT RECOVERY AND CLARITY[d]

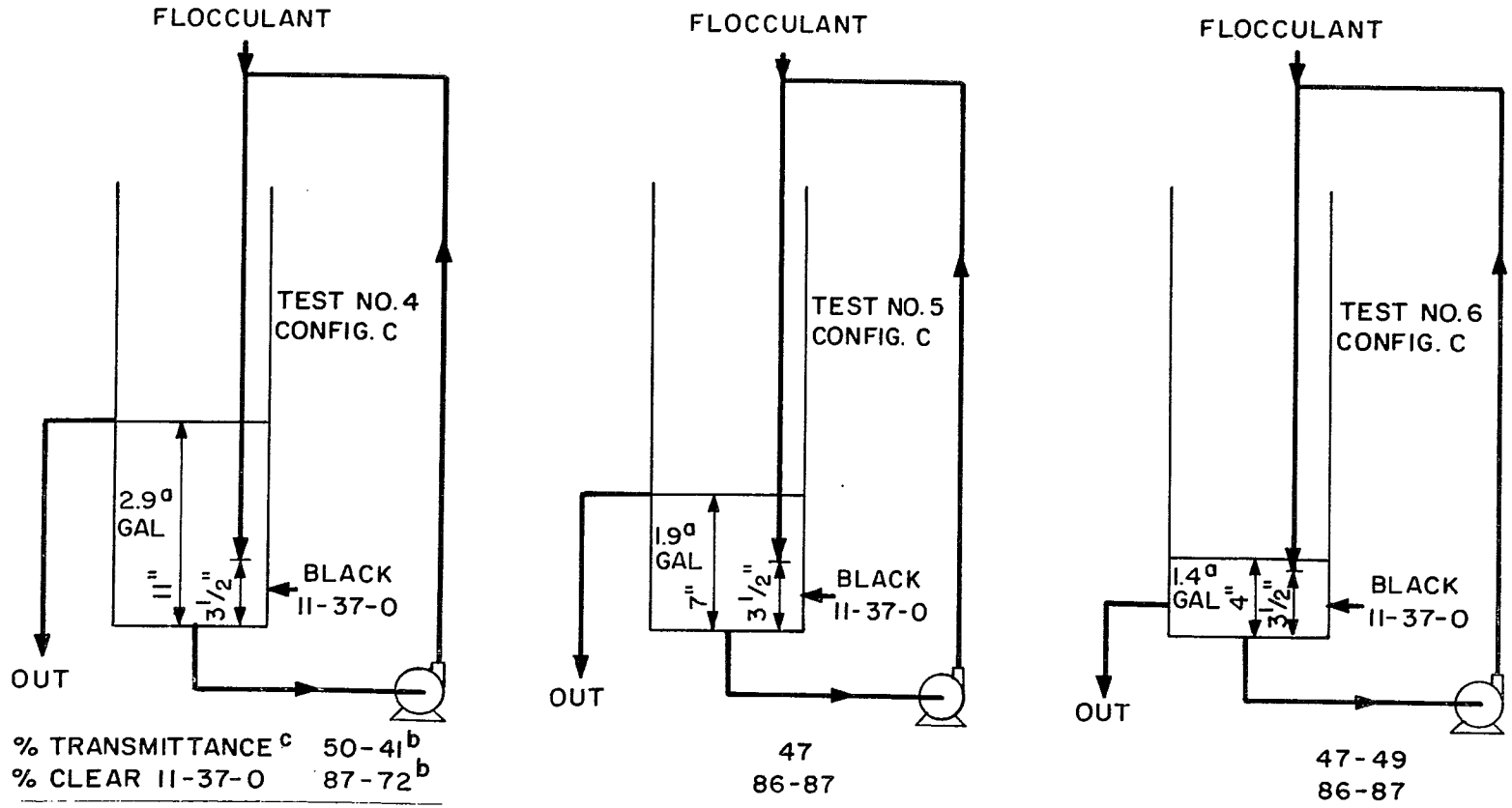

[a] VOLUME OF MIXER RESERVOIR AND RECIRCULATION LINE.
[b] THE CLARITY AND/OR RECOVERY OF THE LIQUID DID NOT REACH STEADY STATE AND DECREASED WITH TIME.
[c] % TRANSMITTANCE DETERMINED AT 560 NANOMETERS; DISTILLED WATER USED AS 100% TRANSMITTANCE STANDARD.
[d] BLACK 11-37-0 (BATCH B-29 IN 4-GAL TEST; B-30 IN ALL OTHERS--SEE FOOTNOTE, TABLE I, FOR DESCRIPTION) FEED RATE, .600 LB/HR; 2 LB ARMEEN T + 2 LB ARQUAD 2HT-75 AT 140°F MIXED WITH 170°-180°F FOR 36 PASSES THROUGH THE 30-GAL/MIN MIXING PUMP. FLOCCULATED LIQUIDS EVALUATED BATCHWISE AFTER STORAGE FOR 1 HOUR AT 170°F.

Fig. 7

CONFIGURATIONS OF PILOT PLANT MIXER USED IN CONTINUOUS MIXING OF BLACK 11-37-0 WITH FLOCCULANTS-EFFECTS ON PRODUCT RECOVERY AND CLARITY[d]

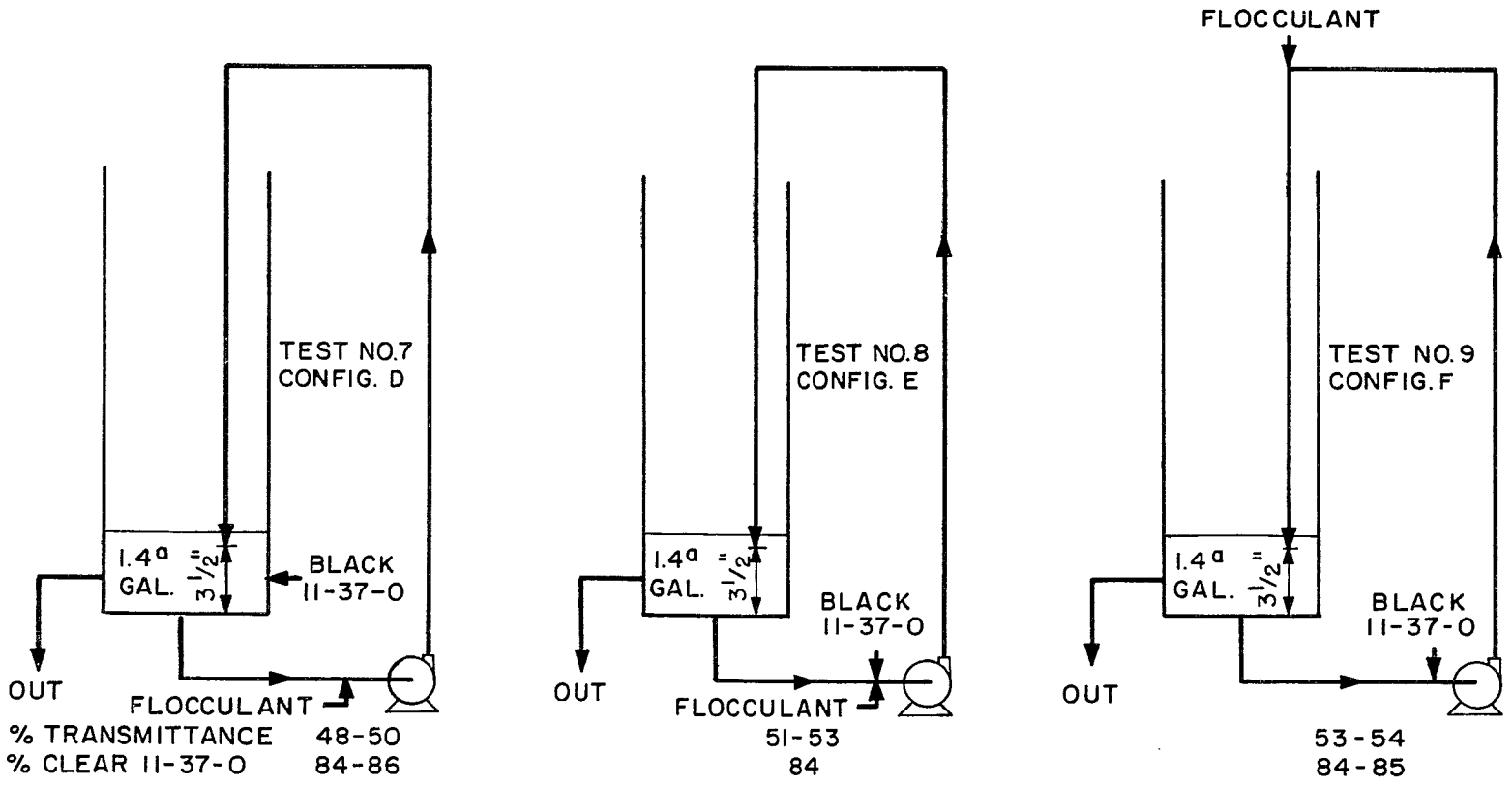

a VOLUME OF MIXER RESERVOIR AND RECIRCULATION LINE.
b BLACK 11-37-O (BATCH B-29 IN 4-GAL TEST; B-30 IN ALL OTHERS--SEE FOOTNOTE, TABLE I, FOR DESCRIPTION) FEED RATE, 600 LB/HR; 2 LB ARMEEN T + 2 LB ARQUAD 2HT-75 AT 140°F MIXED WITH 170°-180°F FOR 36 PASSES THROUGH THE 30-GAL/MIN MIXING PUMP. FLOCCULATED LIQUIDS EVALUATED BATCHWISE AFTER STORAGE FOR 1 HOUR AT 170°F.

Fig. 8

CONFIGURATIONS OF PILOT PLANT MIXER USED IN CONTINUOUS MIXING OF BLACK 11-37-O WITH FLOCCULANTS-EFFECTS ON PRODUCT RECOVERY AND CLARITY[b]